Patented June 26, 1951

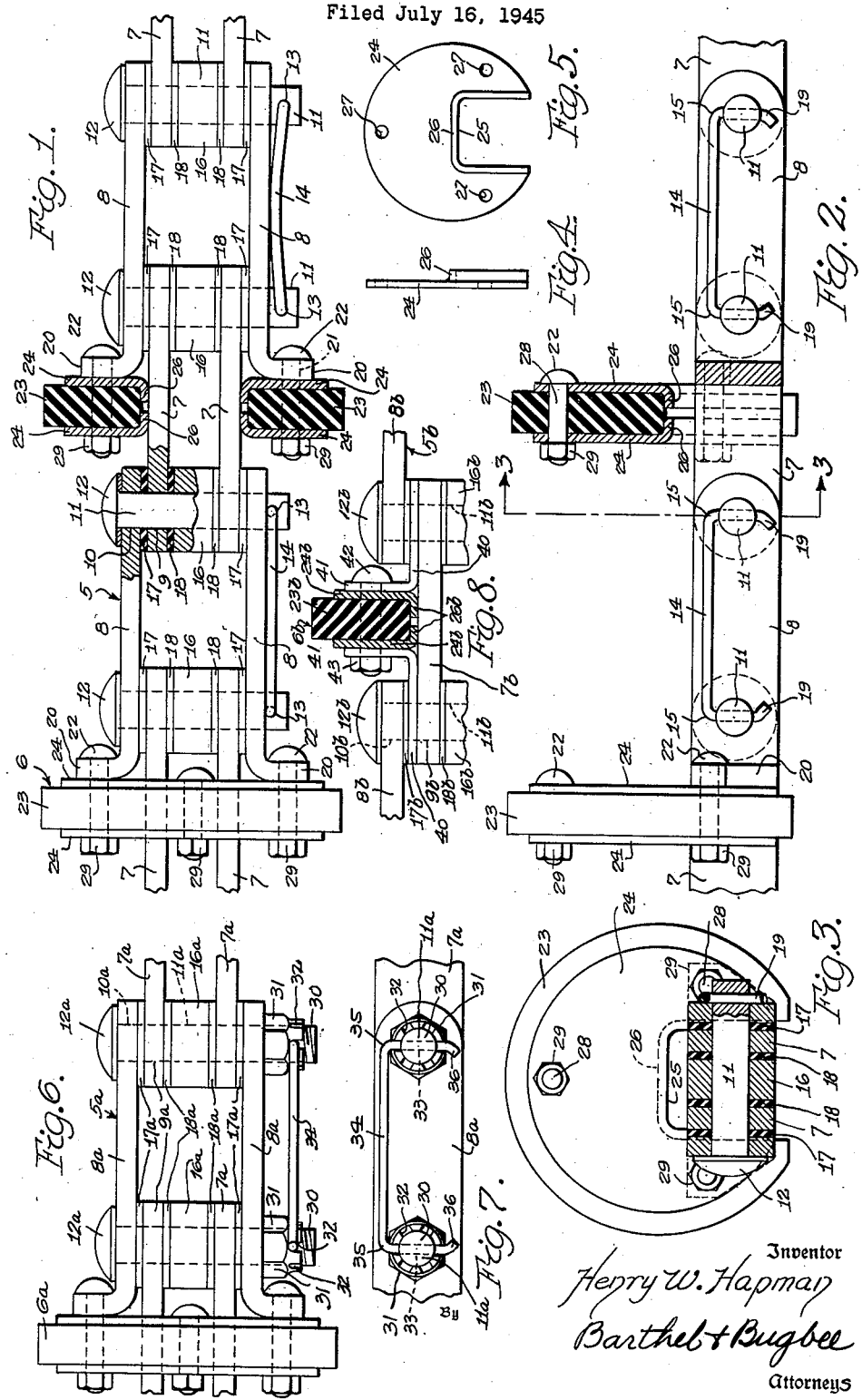

2,557,963

UNITED STATES PATENT OFFICE 2,557,963

CONVEYER AND DRIVE CHAIN

Henry W. Hapman, Detroit, Mich., assignor, by mesne assignments, of forty per cent to Hannah J. Hapman, Detroit, Mich.

Application July 16, 1945, Serial No. 605,252

6 Claims. (Cl. 74—251)

The present invention relates to improvements in drive chains and conveyor structures.

The primary object of the invention is to provide a drive and conveyor chain with means for preventing excessive wear between the wear surfaces of the chain as well as any other movable parts of the chain structure.

Another object of the invention is to provide a drive and conveyor chain structure having resilient rubber or rubber composition washers disposed between the side bars of the chain and rollers thereof to prevent excessive wear of the movable chain parts and to prevent materials being handled by the conveyor chain from finding their way to the bearing and other wear surfaces of the chain structure.

Another object of the invention is to provide a drive and conveyor chain in which certain wearing surfaces are spaced by elastic washer members to facilitate the assembly of the various chain parts under tension to further insure against the material being handled finding its way to the movable wear surfaces of the chain structure.

Another object of the invention is to provide a conveyor chain structure having a series of pintle pins for holding the side bars and rollers of the chain in assembled relation with the rubber or artificial rubber washer members therebetween held under compression by means of nuts or the like so arranged as to compress the rubber or artificial rubber washers between the side or link bars of the chain and the roller members thereof to exclude material from the various bearing surfaces of the roller and pintle as well as the radial wall surfaces of the roller which ordinarily engage the end portion of the side or link bars.

Another object of the invention is to provide a conveyor and drive chain for conveyor structures in which the pintle pins are adapted to be retained by wire locking or retaining clips having end portions for being received in openings in the ends of the pintle pins to thereby retain the pintle pins in position and simultaneously place the rubber or artificial rubber washers under compression by exerting pressure on the side bars or links of the conveyor chain structure.

Another object of the invention is to provide a drive and conveyor chain for conveyor structures with a resilient rubber or artificial rubber flight member therefor which is uniquely held in position and is provided with a pair of backing plates arranged one on each side of each resilient flight member to facilitate fastening of said conveyor flight to the lug projections of the chain structure and permit the marginal edge of the resilient flight member to extend or project beyond the edges of the backing members or plates and allow the projecting edges to convey material through a conduit or conveyor passageway.

Another object of the invention is to provide a conveyor chain and conveyor structure as above set forth in which the conveyor flights are provided with notches for permitting passage of the conveyor chain structure over a drive sprocket or the like.

Another object of the invention is to provide a conveyor element with a series of equidistantly spaced conveyor flights thereon which are removably attached to lugs or projections carried by the conveyor element and are arranged to straddle the conveyor element and be detachably secured thereto.

Another object of the invention is to provide a drive and conveyor chain of the above-mentioned type in which the various wear surfaces of the chain structure will be automatically lubricated by the wax solvent in the artificial rubber composition, thereby further insuring against excessive wear on the various wear surfaces and reducing frictional wear of the mutual wear surfaces of the chain parts.

Other objects and advantages of the invention will become apparent during the course of the following description of the accompanying drawing, wherein:

Figure 1 is a fragmentary top plan view of a conveyor element or drive chain embodying the present invention showing portions thereof in section and broken away to illustrate the various structural details of the chain and conveyor flight members;

Figure 2 is a side elevational view also showing one of the conveyor flights in cross section to illustrate the details of construction and show the manner in which the rubber flight elements are held between a pair of clamping plates arranged one on each side thereof;

Figure 3 is a vertical cross-sectional view taken on line 3—3 of Figure 2 and illustrating various details of construction and showing one of the pintle pins of the drive and conveyor chain and the manner in which the roller thereof is spaced from the ends of the side bars by resilient rubber or artificial rubber washers;

Figure 4 is a side elevational view of one of the conveyor flight clamping plates showing the manner in which the same is flanged along the radial notch thereof to provide a protective portion for the rubber or artificial rubber figiht members;

Figure 5 is a rear elevational view of one of the clamping plates further showing the inwardly directed flange extending around the marginal edge of the radial notch for protecting the rubber or rubber composition conveyor flight members;

Figure 6 is a fragmentary top plan view of a modified form of the invention showing the manner in which the pintle retaining nuts are held in place and against removal by means of resilient locking wire members;

Figure 7 is a fragmentary side elevational view of the modified form of the invention shown in Figure 6 showing the manner in which the resilient locking wire element has its ends extended through suitable bores in the ends of the pintle pins; and Figure 8 is a fragmentary top plan view of a still further modified form of the invention showing a portion broken away to illustrate the manner in which the flight elements are secured to the conveyor and drive chain.

Brief description of the invention

The invention comprises a combined conveyor and drive chain which is formed of a series of inner and outer link members having their overlapping ends connected by pintle pins and sprocket wheel engaging rollers interposed between the inner link members to provide a so-called roller-type drive and conveyor chain. The overlapping ends of the inner and outer links are spaced by resilient washer members formed of synthetic rubber or rubber composition, and similarly, the ends of the inner links are spaced from the sprocket wheel engaging rollers by resilient washers of the same diameter as the first-mentioned washers and are also formed of rubber composition or synthetic rubber.

The invention also provides and contemplates a novel conveyor flight element formed of synthetic rubber and having clamping plates disposed one on each side thereof and arranged so that the yielding synthetic rubber or rubber composition flights project a slight distance beyond the marginal edge of the clamping plate. Suitable lugs are provided on the outer chain links or carried by the conveyor and drive chain for retaining the conveyor flight elements in place and simultaneously clamping and compressing the clamping plates into position so as to securely hold the rubber composition or synthetic rubber flight members therebetween.

Detailed description of the invention

Attention is directed to Figures 1 to 5 inclusive wherein there is shown a preferred embodiment of the invention and wherein the reference character 5 will generally be employed to designate a conveyor and drive chain of the roller type having a series of conveyor flights 6 secured thereto at equidistantly spaced locations along the conveyor and drive chain.

The conveyor and drive chain 5 comprises a series of pairs of inner links 7 and a series of pairs of outer links 8. The ends of the links 7 and 8 are provided with apertures 9 and 10 respectively for receiving pintle pins 11 which are provided at one end with an enlarged head portion 12 and at the other end with an opening 13 for receiving a locking member or retaining wire 14, which serves as a washer-compressing member in the manner described below. The ends of the wire 14 are angularly bent as at 15 for being passed through the opening 13. It is intended that the wire retaining element 14 be curved or formed arcuate between the bent end portions 15 so as to exert a yielding pressure on the outer links 8 adjacent said retaining wire element 14, and thus place the ends of the links under tension for a purpose which will be hereinafter more fully described.

The ends of the inner links 7 are spaced by a series of sprocket engaging rollers 16 and interposed between the ends of the inner and outer links 7 and 8 as well as the inner links 7 and sprocket-engaging rollers 16 are synthetic rubber or rubber composition washers 17 and 18. The synthetic rubber washers 17 and 18 may be formed of a neoprene or butadiene having a wax solvent to automatically lubricate the mutual bearing surfaces of the chain parts, or any other rubber composition which will resist the action of chemicals and will form a tight sealing joint between the side bars or links of the chain as well as the bearing surfaces of the pintle pins 11 and the rollers 16 so as to exclude abrasive material from said bearing surfaces and prevent excessive wearing thereof.

When the inner and outer chain links 7 and 8 are arranged with their ends in overlapping relation and the washers 17 and 18 are disposed between the inner links 7 and 8 as well as the inner links 7 and rollers 16, the pintle pins 11 may be tightly drawn into place by the retaining wires 14, and before the retaining wires 14 are placed in position, the outer links 8 may be urged toward one another so as to compress the washers 17 and 18 and thereby provide a joint which is under compression and held under compression by the retaining locking wire members 14. After the locking wire elements 14 are in position, the free ends of the angular portion 15 may be bent slightly as at 19 to prevent the displacement thereof. When the locking elements 14 are in place, they will assume a relatively straight position, or by simply bending the retaining wires 14 to a greater degree and placing the openings 13 adjacent the ends of the pintle pins 11, a slight amount of compressional force may be exerted on the washers 17 and 18 when the chain parts are assembled.

As illustrated in Figure 1, the outer links 8 are provided with lug projections 20 extending from each side of the conveyor and drive chain and are provided with openings 21 for receiving conveyor flight retaining bolts 22. The conveyor flights are formed of yielding synthetic rubber or rubber composition flight elements 23 which are of disc-like formation and are provided with a radially extending notch for the purpose of receiving the inner links 7 of the conveyor and drive chain. Each of the clamping plates 24 is provided with a notch 25, the marginal edge of which is bent to provide an inwardly extending flange 26 so as to extend inwardly from the opposite faces of a rubber composition or rubber conveyor flight element 23, when the conveyor flight elements and clamping plates are assembled as shown in Figure 1. The synthetic rubber or rubber composition conveyor flights are provided with a series of circumferentially spaced apertures which are adapted to align with circumferentially spaced apertures 27 in the clamping plates 24. The bolts 22 are adapted to extend through a pair of adjacent apertures 27 on each side of the notch 25 so as to securely hold the flight elements in position in equidistantly spaced apart relation on the conveyor and drive chain 5. Additional retaining bolts 28 are provided for the remaining aperture or apertures 27 to securely clamp the clamping plates 24 in position with respect to the conveyor chain and with the synthetic rubber or rubber composition flight elements sandwiched therebetween. It will thus be seen that the inturned flanges 26 of the clamping plates 24 protect the inner edges of the radial notch or slot in the synthetic rubber flight elements 23 and prevent excessive wear from engagement with the inner chain links 7. Suitable nuts 29 may be threaded on the bolts 22 and 28 so as to facilitate the clamping plates being tightly drawn into position and thereby hold the yielding rubber flight elements against displacement.

In the form of the invention shown in Figures 6 and 7, is shown a slightly modified structure and the invention comprises a conveyor drive chain 5a having a series of resilient rubber or rubber composition conveyor flight elements 6a spaced thereon equal distances. The conveyor chain is similar in construction to that shown in Figures 1 to 5 inclusive and includes inner and outer chain links 7a and 8a having their ends arranged in overlapping relation and provided with apertures 9a and 10a for receiving a pintle bolt 11a having a head portion 12a and a threaded end portion 30. Yielding synthetic rubber or rubber composition washers 17a and 18a are interposed between the inner and outer chain links as well as the inner links and rollers 16a. Threaded on the ends of the pintle pins 11a are suitable castellated cap nuts 31 having a series of recesses 32 in the cap portion thereof for being aligned with transversely extending openings 33 in the threaded ends 30 of the pintle pins 11a. The castellated cap nuts 31 are adapted to be tightly drawn in place on the threaded end 30 of the pintle pins 11a so as to place the yielding synthetic rubber or rubber composition washers 17a and 18a under compression. By adjusting the nuts 31, the degree of compression may be regulated and in order to hold the castellated cap nuts 31 in place, combined locking and retaining wires 34 are provided and have angularly bent ends 35 for being received in the transversely extending bores 33 in the pintle pins 11a. After the retaining wires 34 are in place, the free ends thereof as at 36 are slightly bent to prevent displacement of the locking bars and thus retain the castellated cap nuts against removal.

The conveyor flight structure 6a in the modified form of the invention shown in Figures 6 and 7 is identical to that shown in Figures 1 to 5 inclusive, and hence a description thereof need not be given. It is sufficient to say that the conveyor flight element 6a also includes yielding synthetic rubber or rubber composition flight elemens sandwiched between clamping plates which are held in place on lugs similar to the lugs 20 in Figures 1 to 5.

In the modified form of the invention shown in Figure 8, the invention comprises a conveyor and drive chain 5b having a series of endless conveyor flights 6b secured thereto and spaced therealong equidistantly. The conveyor chain 5b includes inner and outer links 7b and 8b which have their ends overlapped and provided with apertures 9b and 10b for receiving pintle pins 11b having headed portions 12b. The overlapped ends of the inner and outer links 7b and 8b are spaced by resilient synthetic or rubber composition washer members 17b and similarly, the ends of the inner links 7b are spaced from the conveyor rollers 16b by resilient synthetic rubber or rubber composition washers 18b. The pintle pins 11b may be retained in place by the locking means shown in Figures 1 or 6 so as to place the washers 17b and 18b under compression when the chain parts are assembled.

In the modified form of the invention shown in Figure 8, the invention comprises in combination with the chain structure, a pair of angle brackets 40 for being supported on a pair of adjacent pintle pins 11b. Suitable apertures are provided in one of the flanged portions of the angle brackets 40 for receiving the pintle pins 11b and as shown in the drawing, the flanged portion received thereon is interposed between the inner link 7b and the yielding synthetic rubber or rubber composition washer 17b. The other flanged portions 41 of the angle bracket 40 extend laterally from the inner chain link 7b and are adapted to support a conveyor flight element therebetween which is constructed similar to the conveyor flight elements 6 and 6a (Figures 1 to 7 inclusive) and includes a yielding rubber flight element 23b of either disc-like or rectangular shape for being secured between clamping plates 24b arranged one on each side thereof, so that retaining bolts 42 may be passed therethrough and held in place by nuts 43 secured in place on the threaded ends thereof. The yielding or flexible conveyor element 23b is provided with a radial notch to facilitate the straddling of the conveyor chain inner link 7b in substantially the same manner as pointed out in connection with the form of the invention shown in Figures 1 to 5 inclusive. Similarly, the clamping plates 24b are provided with radially extending slots or notches for straddling the edge of the inner links 7b, and marginal flanges 26b are formed adjacent the edge of the notch for extending inwardly from opposite sides of the yielding or resilient conveyor flight element 23b.

It is to be noted that the conveyor flight elements 6, 6a and 6b are arranged to straddle the inner links of the conveyor and drive chain and that the lacing and retaining wire elements are positioned between the conveyor flight elements to hold the outer links 8 in position and so that the wire retaining elements will not interfere with the free movement of the conveyor flight element when the endless conveyor structure is mounted in a conduit or other conveyor passageway.

It is to be understood that the combined conveyor and drive chain above described is to be of endless form and that by removing certain links therefrom, the circular size may be adjusted to any desired dimensions. While the invention is primarily intended for use in connection with the conveying of finely divided or powdered material such as lamp black and the like, where the particles of material are so fine that the handling thereof by the conveyor is prohibited, the conveyor structure may be used for liquid compositions or other materials without departing from the spirit of the invention or the subjoined claims.

It is intended to employ a synthetic rubber or rubber composition for the washer members, having a wax solvent so that the friction surfaces of said inner and outer link members as well as the pintle pins will be lubricated without necessitating the use of extraneous lubricating means.

While a roller chain of conventional structure has been described to illustrate the invention, it is to be understood that the invention is applicable to all pintle type chain structures, such as hog scraper, ice chain drag scraper and combination chains which operate without rollers. The flight conveyor structure disclosed herein, with provision for the automatic take-up of wear therein, is described and claimed in my application Serial No. 676,546 filed June 13, 1946, for Flight Conveyor, which is a continuation in part of the present application.

What I claim is:

1. A drive chain having link members arranged with their ends in overlapping relation, pintle pins pivotally connecting said overlapping ends of said link members on transversely disposed pivot axes, all of said link members being freely slidable axially relatively to their respective pintle pins to compress their respective washer members, yielding washer members interposed between the overlapping ends of said link members and supported on said pintle pins, and compression members engaging and urging said link members axially along said pintle pins into sealing engagement with said washer members.

2. A drive chain having outer and inner link members arranged with their ends in overlapping relation, pintle pins pivotally connecting said overlapping ends of said outer and inner link members, all of said link members being freely slidable axially relatively to their respective pintle pins to compress their respective washer members, sealing members of resilient material mounted on said pintle pins and disposed between said overlapping ends of said link members for excluding conveyed material from the bearing surfaces of said pintle pins, and compression members engaging and urging said link members axially against said sealing members for placing said sealing members under compression.

3. A drive chain having link members composed of side bars arranged with their ends in overlapping relation, pintle pins extending through openings in the overlapping ends of said side bars to connect said links together, said link members being freely slidable along said pintle pins yielding washer members mounted on said pintle pins and disposed between the overlapping ends of said side bars, and an arcuately curved resilient compression member connecting the ends of a pair of adjacent pintle pins and yieldingly urging said side bars axially along said pintle pins into sealing engagement with said washer members and placing said washer members under compression.

4. A drive chain having link members composed of side bars arranged with their ends in overlapping relation, pintle pins extending through openings in the overlapping ends of said side bars to connect said links together, said link members being freely slidable along said pintle pins yielding washer members mounted on said pintle pins and disposed between the overlapping ends of said side bars, said washer members being formed of rubber, and arcuately curved resilient compression members supported by certain of said pintle pins and exerting pressure on the side bars to urge said bars axially along said pintle pins into sealing engagement with said washer members and thereby compress said yielding washer members.

5. A drive chain having link members arranged with their ends in overlapping relation, pintle pins connecting said link members, said link members being freely slidable along said pintle pins yielding washer members interposed between the overlapping ends of said link members and supported on said pintle pins, said washer members being formed of a synthetic rubber composition having a wax solvent to lubricate the surfaces of said link members, and compression members engaging and urging said link members axially along said pintle pins into sealing engagement with said washer members.

6. A drive chain having link members composed of side bars arranged with their ends in overlapping relation, pintle pins extending through openings in the overlapping ends of said side bars to connect said links together, said link members being freely slidable along said pintle pins yielding washer members mounted on said pintle pins and disposed between the overlapping ends of said side bars, said washer members being formed of a synthetic rubber composition having a wax solvent to lubricate the wear surfaces of said link members as well as the other parts of said chain structure, and compression members engaging and urging said link members axially along said pintle pins into sealing engagement with said washer members.

HENRY W. HAPMAN.

REFERENCES CITED

The following references are of record in the file of this patent:

UNITED STATES PATENTS

| Number | Name | Date |
| --- | --- | --- |
| 840,240 | Nicholson | Jan. 1, 1904 |
| 1,933,653 | Bremer | Nov. 17, 1933 |
| 1,939,986 | Kloucke | Dec. 19, 1933 |
| 1,970,250 | Redler | Apr. 14, 1934 |
| 2,141,771 | Sparling | Dec. 27, 1938 |
| 2,147,199 | Hapman | Feb. 14, 1939 |
| 2,265,672 | Redler | Dec. 9, 1941 |
| 2,290,077 | Sinden | July 14, 1942 |
| 2,411,207 | Hait | Nov. 19, 1946 |